United States Patent [19]

Weaver

[11] Patent Number: 4,850,295
[45] Date of Patent: Jul. 25, 1989

[54] DAVIT SYSTEM FOR AN INFLATABLE DINGHY OR OTHER SMALL INFLATABLE BOAT

[76] Inventor: Robert J. Weaver, 13305 Old Hwy. 99, Marysville, Wash. 98270

[21] Appl. No.: 103,881

[22] Filed: Oct. 2, 1987

[51] Int. Cl.⁴ .......................... B63B 23/00; B63B 35/40
[52] U.S. Cl. ........................................ 114/259; 24/239; 114/365
[58] Field of Search ................. 114/345, 259, 258, 44, 114/365, 368, 230; 24/239

[56] References Cited

U.S. PATENT DOCUMENTS

| | | | |
|---|---|---|---|
| 1,686,366 | 10/1928 | Boyle | 114/345 |
| 3,143,991 | 8/1964 | Anderson | 114/365 |
| 3,763,813 | 10/1973 | Holtz | 114/345 X |
| 3,935,607 | 2/1976 | Cantwell et al. | 114/345 |

OTHER PUBLICATIONS

Weaver Snap Davits for Inflatable Boats, brochure published Jan. 16, 1987, by Weaver's Ornamental Iron, Inc.

*Primary Examiner*—Sherman D. Basinger
*Attorney, Agent, or Firm*—Larry A. Jackson

[57] ABSTRACT

A davit for an inflatable dinghy or other small inflatable boat including a pair of lock devices secured to the stern of the carrier boat for engaging and supporting hanger assembly mounted on the inflatable dinghy and enabling the dinghy, to be swung between in-water and out-of-water positions, and a pair of stand-off brackets attached to the stern of the carrier boat that support the inflatable dinghy in its raised out-of water position. Each hanger assembly has an outboard catch supported by a resilient, flexible pad which in turn is adhesively secured to the dinghy sidewall and is designed to transfer the load of the inflatable dinghy without damaging the flexible dinghy sidewall or causing the support pad to separate therefrom.

18 Claims, 5 Drawing Sheets

DAVIT SYSTEM FOR AN INFLATABLE DINGHY OR OTHER SMALL INFLATABLE BOAT

BACKGROUND OF THE INVENTION

This invention generally relates to davits and more particularly to a novel davit system especially suited for stowing of an inflatable dinghy or other small inflatable boat at the stern of a carrier craft. The davit system and its components are uniquely constructed so that the inflatable dinghy can be rotated between a horizontal, in-water position to a vertical, out-of-water stowed position without damaging the tubular sidewall of the inflatable dinghy or causing separation of the davit hardware that is attached.

In recent years various types of davits have been introduced to lift both hardshell and inflatable dinghies and other small boats from the water and to secure them to carrier boats. One of these devices designed for hardshells is shown for example in the following Davis U.S. Pat. No. 3,442,241.

The above mentioned prior art davits and others, however, all have proved unsatisfactory for various reasons. For example, prior davits for inflatable dinghies require elaborate metal frames that span the width of the dinghy, some of which are combined with either a winch or a hinge system with telescoping arms. Due to the large amount of material and/or moving parts needed to construct these davits, they are expensive, require extensive maintenance and are more prone to breakdown.

Furthermore, most of the previous systems required one to slide the inflatable dinghy into an underwater catch device resulting in inconvenience because the catches are often obscured from vision due to water refraction or murkiness. A further inconvenience of the underwater catch device is that most of the davits require one to exit the dinghy prior to attachment. The result is a more time consuming procedure because of the extra time necessary to leave the inflatable dinghy, and a more cumbersome procedure because no one can remain in the inflatable dinghy to guide it into the davit catch, which is especially a disadvantage in rough water where an unattended inflatable dinghy may be carried away.

The prior forms of davits for inflatable dinghies that do allow one to stay in the inflatable dinghy are also inconvenient. Not only do these davits allow you to use two people, but they require you to use two people, one in the inflatable dinghy and one in the carrier boat, to secure the dinghy prior to lifting.

Another disadvantage of the prior davits for inflatable dinghies is the fact that the large frames are both an eyesore and present a safety hazard to individuals working near them.

Prior davit systems designed for hardshell dinghies have been unsatisfactory for inflatable dinghies because the portion of the fastening device attached to the hardshell dinghy could not be attached to an inflatable dinghy due to the need for screws, bolts or rivets since the material of the fastening device would not form an adhesive bond with adhesives designed for general inflatable dinghy use.

Another disadvantage of the davits for hardshell dinghies is that the fastening device to be attached to the inflatable dinghy is too rigid and inflexible, resulting in either a rip in the inflatable dinghy material or the violent removal of the fastening device as the weight of the inflatable dinghy is transferred to the fastening devices during the lifting operation.

Considering the aforementioned as well as other problems associated with prior designs of davits, it is an object of this invention to provide an improved davit for inflatable dinghies and other inflatable boats that is inexpensive to manufacture, virtually service free, simple in design, resistant to break down, safe to work near, and aesthetically discrete.

Another object of the present invention is to provide an improved davit with the aforementioned characteristics which enables a single boatsman to rapidly and easily connect an inflatable dinghy or other small inflatable boat to a carrier boat even in high seas and rough water.

A further object of the present invention is to provide an improved davit with the aforementioned characteristics which enables a single boatsman to rapidly and easily swing the dinghy between a lowered, horizontal, in-water position and a raised, vertical, out-of-water position against the side of the carrier boat.

Yet another object of the present invention is to provide an improved davit with the aforementioned characteristics which enables a single boatman to move the inflatable dinghy between the aforementioned in-water and out-of-water positions without ripping the material of the inflatable dinghy's tubular sidewall or violently removing the fastening device attached to the dinghy due to the weight transfer occurring during the lifting operation.

SUMMARY OF THE INVENTION

This invention can broadly be summarized as a davit system for an inflatable dinghy or other small inflatable boat that includes a pair of spaced hanger assemblies, a pair of lock devices, and stand-off support bracket means. Each hanger assembly is comprised of a resilient, flexible pad that is secured such as by adhesive to the fabric of the dinghy sidewall and an outboard catch supported by the pad so as to extend outwardly from the sidewall. The lock devices are fixed relative to and extend rearwardly from the stern of a carrier boat, and each includes a clasp, inner bar portion, and outer hook portion together configured to defining a support slot for receiving and locking the outboard catch of an aligned hanger assembly and to accommodate weight of the dinghy as it is swung upwardly and downwardly between a lowered, generally horizontal, in-water position and a raised, generally vertical, out-of-water stowed position parallel to the plane of the stern.

In accordance with a further aspect of the invention, the catches of the hanger assemblies are each comprised of a bar having a u-shaped bend with two lock locating teats to center the locks in the u-shaped bend. Each pad is reinforced with elastimerized cloth strips and metallic plates such that, as the inflatable dinghy is rotated between its horizontal, in-water position and vertical, out-of-water position, the pad transfers the heavy load of the inflatable dinghy to a relatively large area of the dinghy sidewall in order to prevent tearing of the sidewall fabric and consequent violent removal or progressive separation of the hanger assembly pad from the dinghy.

The lock devices each include a hand releasable spring biased clasp having an arched portion that allows the user to slide the u-shaped bend of the outboard catch bar of the hanger assembly into the outer hook portion and inner bar portion so as to restrain the catch. The hanger assembly fits into the lock device such that the catch rests on the inner bar portion of the lock device, centered in this position by the two teats on the u-shaped bend of the catch bar. This stable connection prevents relative lateral movement between the carrier boat and the inflatable dinghy as the latter is swung up into the vertical, stowed position. The dinghy sidewall opposite the hanger assemblies is then secured by a pair of stand-off brackets that are attached to the carrier boat and extend aft to connector pads premounted on the dinghy.

BRIEF DESCRIPTION OF THE DRAWINGS

The foregoing as well as other objects and advantages of the present invention may be more clearly understood by reference to the following detailed description which illustrates the preferred embodiment and various alternative features of the present invention.

In the drawings.

DESCRIPTION OF THE PREFERRED EMBODIMENT

Figure 1:
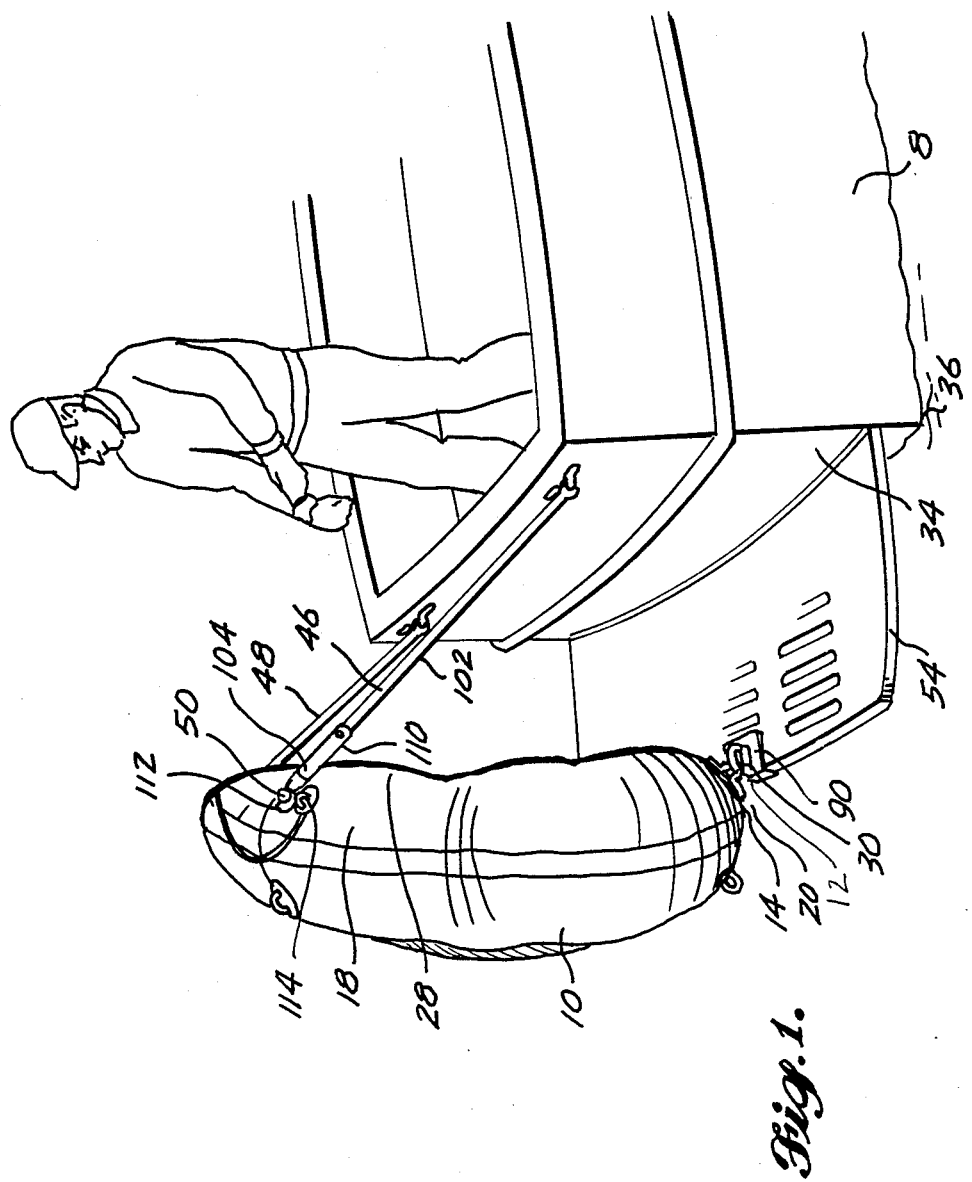
FIG. 1 is a perspective of the preferred form of the davit system of the present invention connected to the stern of a carrier boat and showing the tubular sidewall of an inflatable dinghy or other small inflatable boat.
Figure 2:
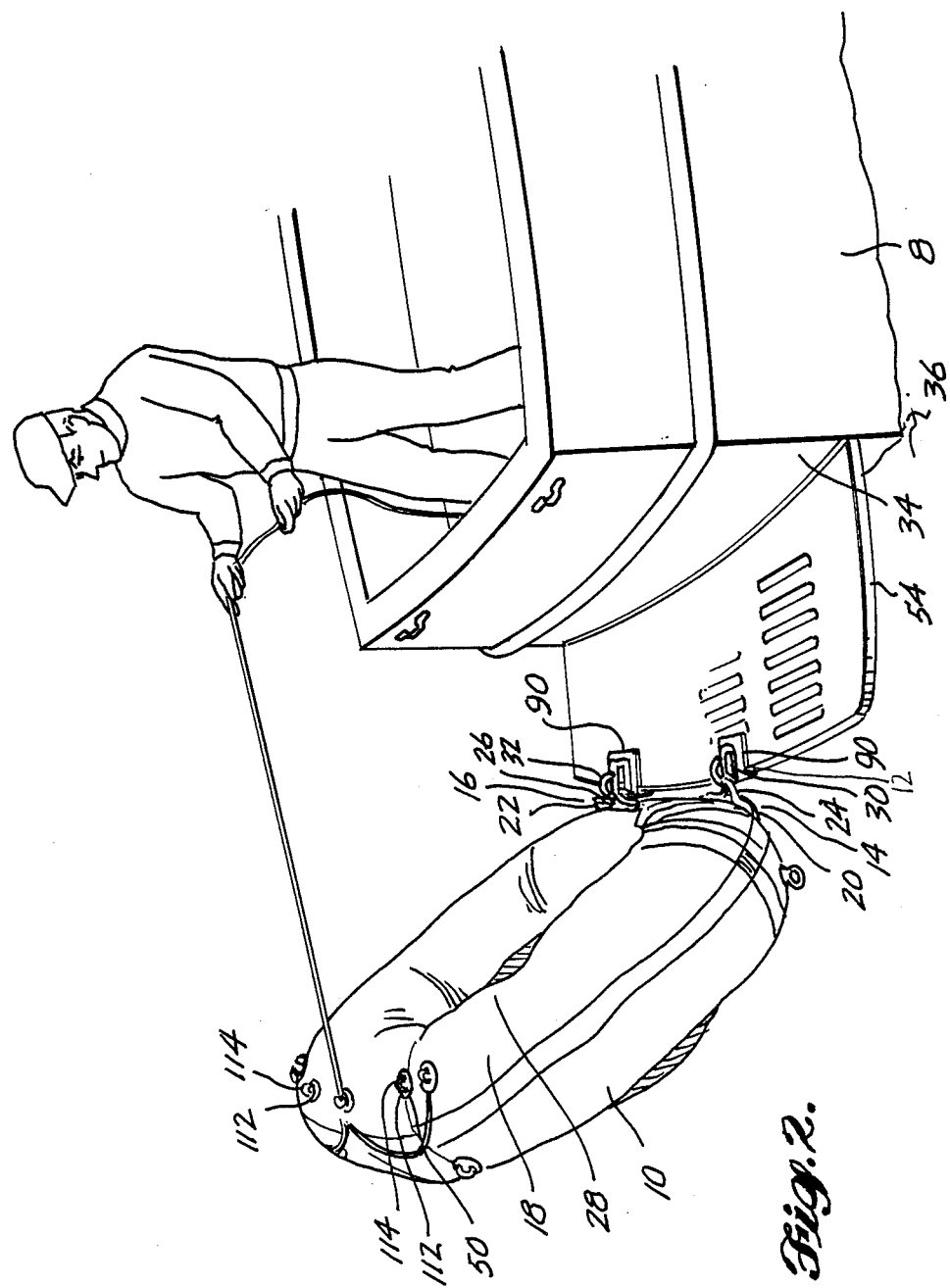
FIG. 2 is a perspective view of the step of raising the inflatable dinghy between a lowered, horizontal, in-water stowed position and a raised, vertical, out-of-water position.

The novel features believed to be characteristic of this invention are set forth in the appended claims. The invention itself, however, may be best understood and its various objects and advantages best appreciated by reference to the detailed description below in connection with accompanying drawings.

In the drawing, the carrier boat is represented by the number 8, the inflatable dinghy or other small inflatable boat by the number 10 and the davit by the number 12.

The davit 12 provides means for docking and locking the inflatable dinghy 10 to the carrier boat 8 so that the inflatable dinghy can be moved between a lowered horizontal, in-water, position and a raised vertical, out-of-water position. The davit 12 includes a pair of spaced hanger assemblies 14 and 16 secured to the tubular sidewall 18 of the inflatable dinghy 10, each hanger assembly including a resilient, flexible pad 20 and 22 affixed to the tubular sidewall 18, and outboard catches 24 and 26 extending above and outwardly beyond the gunwale 28 of the tubular sidewall 18.

The resilient, flexible pads 20 and 22 have sufficient strength and contact area with the sidewall to carry the weight and distribute the load of the inflatable dinghy, thereby allowing it to be raised and lowered without ripping the inflatable dinghy sidewall material, or violently, or progressively pulling the pads from the sidewall.

A pair of lock devices 30 and 32 are fixed relative to and extend rearwardly beyond the swimstep 54 of the carrier boat 8 above the water line 36 thereof. The lock devices 30 and 32 are spaced for alignment with the hanger assemblies 14 and 16, respectively, and each of the lock devices include an outer hook portion 94, an inner bar portion 92 and a clasp 42 defining a supporting slot 44 for receiving the outboard catch 24 (26) of the aligned hanger assembly 14 (16) to accommodate the swing of dinghy 10 upwardly and downwardly between its lowered, horizontal, in-water position and its raised, vertical, out-of-water position.

The davit 12 also includes a pair of stand-off support brackets 46 and 48 attached to the stern 34 of the carrier boat 8 which join with a pair of stand-off pads 50 and 52 attached to the tubular sidewall 18 of the inflatable dinghy 10 for additional support.

Thus arranged, to use the davit 12, the inflatable dinghy 10 is maneuvered into position at the swimstep 54 of the carrier boat 8 where the hanger assemblies 14 and 16 are aligned with the lock devices 30 and 32. To attach the hanger assembly 14 to the lock devices 30, the boatsman either opens the clasp 42 of the lock device 30 with his/her hand, allowing the outboard catch 24 of the hanger assembly 14 to pass into the supporting slot 44 of the lock device 30, or accomplishes the same by simply rocking the inflatable dinghy 10 while the outboard catch 24 rests upon the clasp 42 of the lock device 30. The procedure is then repeated with lock device 32 and hanger assembly 16. The dinghy 10 is then raised to its vertical, out-of-water position by pulling upwardly on a line attached to the dinghy 10. The stand-off support brackets 46 and 48 attached to the carrier boat 8 are then joined to the stand-off pads 50 and 52 attached to the inflatable dinghy 10.

To return the inflatable dinghy 10 to the water, the stand-off support brackets 46 and 48 are removed from the stand-off pads 50 and 52 and the line is released as the inflatable dinghy 10 is lowered into the water.

Figure 3:
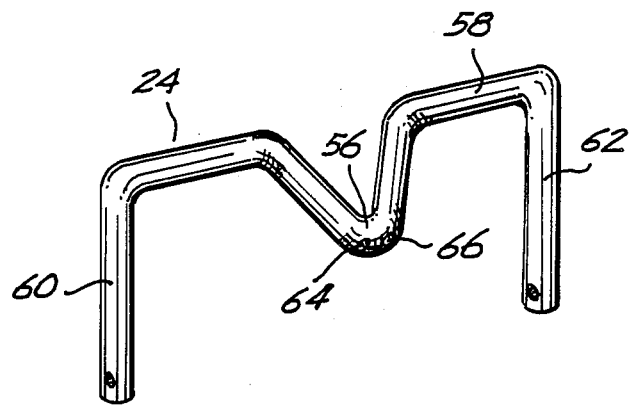
FIG. 3 is a detailed perspective view of the outboard catch bar portion of the hanger assembly having a u-shaped bend, straight bar portion, bent ends and teats.

Referring now in particular detail to the individual components that comprise the above general description of the davit 12, in FIG. 3, the hanger assembly of the davit 12 includes an outboard catch, here 24, which is comprised of a bar 58 having a u-shaped bend 56 located in its center, the ends 60 and 62 of the bar 58 being perpendicular to the major length of the bar 58.

Figure 4:
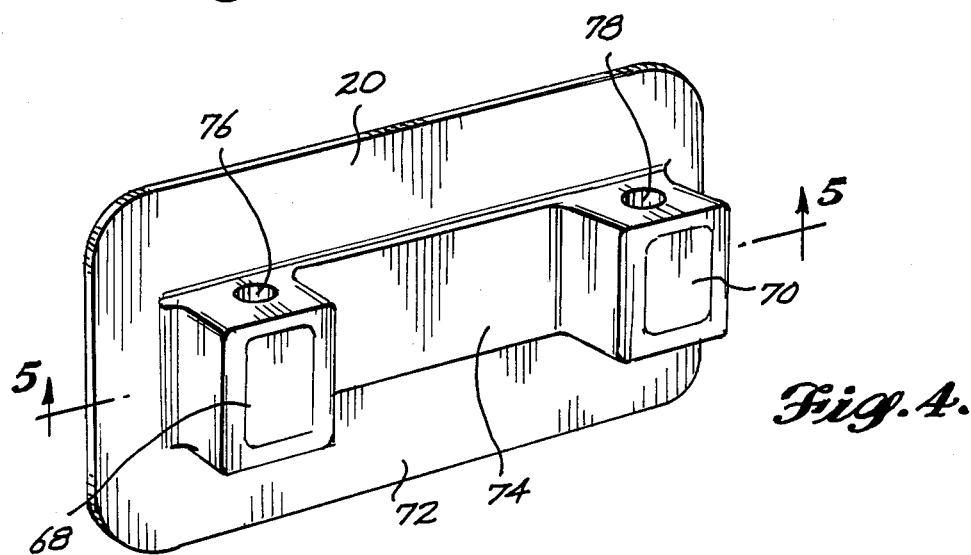
FIG. 4 is a detailed perspective view of the resilient, flexible elongated pad portion of the hanger assembly including two lugs spaced at opposed ends of the pads for securing the ends of the outboard catch bar, and a connecting thickened mid-pad section.
Figure 7:
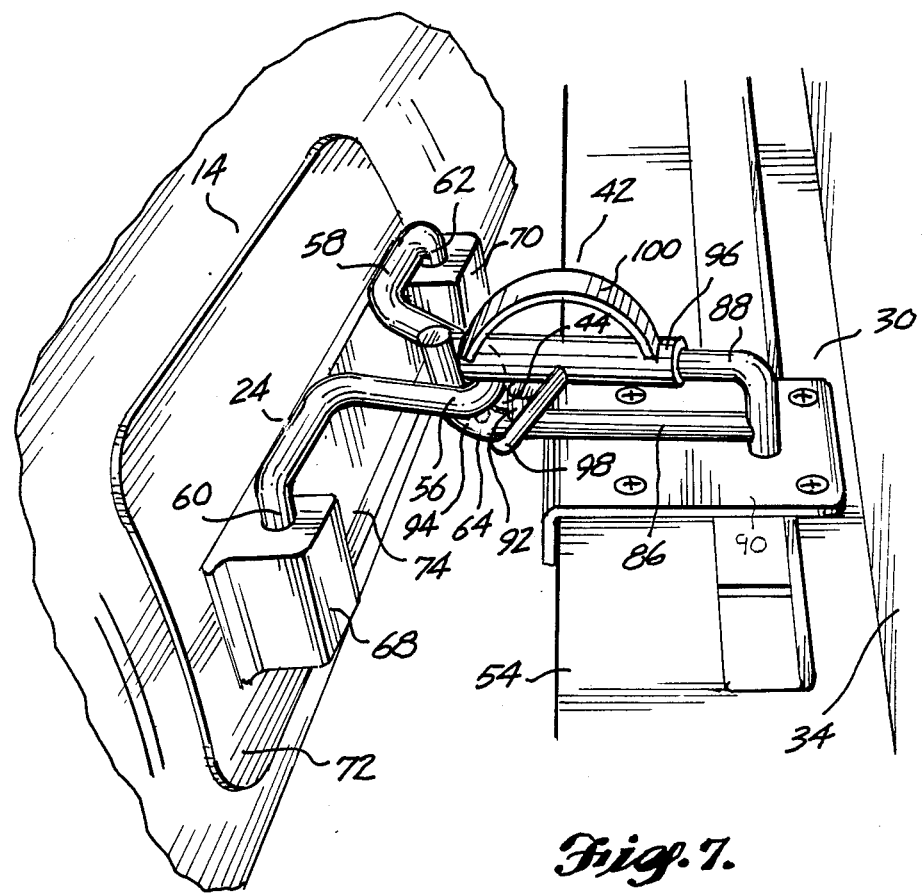
FIG. 7 is an enlarged perspective view of a portion of FIG. 1 showing the engagement between the hanger assembly and the lock device with the lock device attached to the carrier boat's swimstep.

Upon the outboard catch 24, two teats 64 and 66 are located equidistant from the apex of the u-shaped bend 56 upon the bottom one-half of the exterior surface of the u-shaped bend 56. As illustrated by FIG. 7, the ends 60 and 62 are secured into the sides of the two upstanding lugs 68 and 70 located on each of the resilient, flexible pads, here 20. As illustrated in FIG. 4, the resilient, flexible pad, here 20, consist of a thin rectangle 72 with an upstanding lug 68 and 70 located near each elongated end of the pad 20. Two openings 76 and 78 bisect the sides of lug 68 and 70, respectively, and allow attachment of the ends 60 and 62 to the resilient, flexible pad 20. A connecting, thickened section 74 of the resilient, flexible pad 20 connects the lugs 68 and 70.

Figure 5:
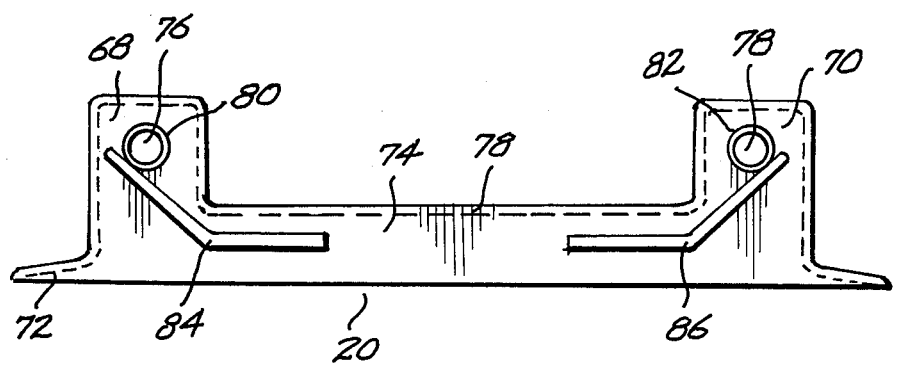
FIG. 5 is a sectional view of the resilient, flexible pad illustrated in FIG. 4 taken along the line 5—5 showing the eaastimerized cloth strip, tubing and plates internally of the resilient flexible pad material.

Referring to FIG. 5, within the resilient, flexible pad, here 20, is an elastimerized cloth strip 78 which extends below the surface of the resilient, flexible pad 20 continuously on the exterior side of each lug 68 and 70, top of each lug 68 and 70, interior side of each lug 68 and 70, and top of the thickened connecting pad section 74. Within the openings 76 and 78 in the lugs 68 and 70 of the resilient flexible pad 20, is hollow tubing 80 and 82. Firmly attached to the bottom of each piece of hollow tubing 80 and 82 are plates 84 and 86 the width of the tubing 80 and 82, the plates 84 and 86 extending into the connecting thickened pad section 74 to such a distance that the center one-half of the thickened pad section 74 does not contain the plates 84 and 86. The above design of the resilient, flexible pads allows the weight of the inflatable dinghy to be carried during the raising or lowering of the inflatable dinghy without ripping the inflatable dinghy sidewall material or violently removing the flexible resilient pads due to the pads' ability to distribute the load of the inflatable dinghy.

Figure 6:
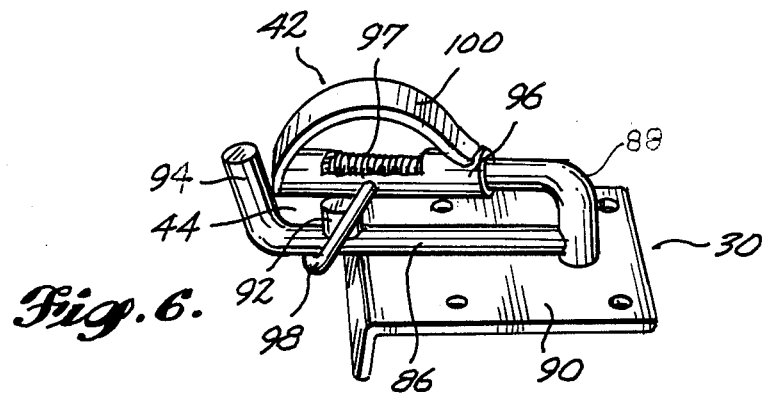
FIG. 6 is a detailed perspective view of the lock device including the base portion, bottom L-shaped bar, top L-shaped bar, clasp, outer hook portion, inner bar portion and u-shaped guide.

As shown in FIGS. 6 and 7, the lock device, here 30, includes two L-shaped rods 86 and 88, the bottom L-shaped rod 86 being connected to a base portion 90, which is connected to swimstep 54, such that the shorter, perpendicular portion of the bottom rod 86 extends over the edge of the base portion 90 and swimstep 54, with the shorter, perpendicular portion of the bottom rod 86 facing away from the base portion 90 and swimstep 54.

The top L-shaped rod 88 is attached to the bottom L-shaped rod 86 such that the shorter, perpendicular portion of the top L-shaped rod 88 attaches to the end of the bottom L-shaped rod 86 not possessing a short, perpendicular portion. Also attached to the bottom L-shaped rod 86 is an inner bar portion 92 which is mounted on, but perpendicular to, the major portion of the bottom L-shaped rod 86 at a distance such that enough space exists between the inner bar portion 92 and the shorter, perpendicular portion of the bottom rod 86, which is the outer hook portion 94, that the outward catch, here 24, of the hanger assembly, here 14, can attach in the support slot 44 such that the inner bar portion 92 is fixed between the teats 64 and 66 located on the u-shaped bend 56, as illustrated in FIG. 7. The resultant stable connection prevents relative lateral movement between the carrier boat and the inflatable dinghy.

As shown in FIGS. 6 and 7, the clasp 42 of the lock device, here 30, allows for releasable securing of the inflatable dinghy 10 to the carrier boat 8. The clasp 42 is comprised of a tubular sheath 96 placed over the top L-shaped rod 88, a spring 97 that urges the sheath 96 to press against the outer hook portion 38, a U-shaped guide 98 attached to both sides of the sheath 96 and passing under the bottom L-shaped rod 86 to prevent clasp torquing, and an arch 100 attached to the top of the sheath 96 at both ends of the sheath 96 to guide the outboard catch, here 24, of the hanger assembly, here 14, into the lock device 30.

Figure 8:
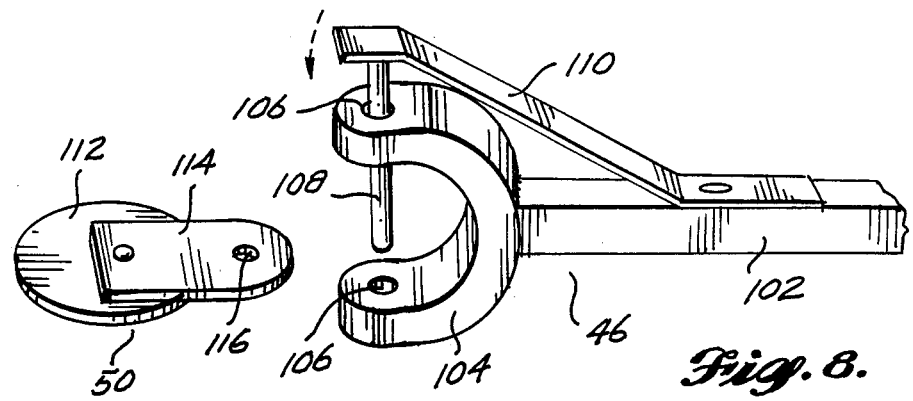
FIG. 8 is a detailed perspective view of the stand-off bracket, showing the rod, u-shaped clasp, stud, and spring-loaded thumb lever, and the stand-off pad, having a base and plate.

As illustrated in FIG. 1 the stand-off support brackets 46 and 48 attach to the carrier boat 8 at the stern 34. The stand-off pads, here 50, attach to the tubular sidewall 18 of the inflatable dinghy 10. FIG. 8 shows that the stand-off support bracket, here 46, includes a rod 102 attached to a U-shaped clasp 104, each side of which contains openings 106 through which a stud 108 passes. The stud 108 is atached to a spring-loaded thumb lever 110 fastened to the rod 102. FIG. 8 also shows that the stand-off pad, here 50, includes a base 112 attached a rectangular plate 114 with an opening 116 in one end. To attach the stand-off support bracket 46 to the stand-off pad 50, the spring-loaded thumb lever 110 is depressed to allow the stud 108 to pass through the opening 116 located in the rectangular plate 114 of the stand-off pad 50.

The stand-off pad 50 and 52, as well as the resilient, flexible pads 20 and 22, are affixed to the tubular sidewall 18 of the inflatable dinghy 10 with the type of adhesive recommended for use on the inflatable dinghy 10 by the dinghy's manufacturer. For example, Hypalon (Trademark) inflatable dinghies require the use of Bostik (Trademark of Bostik Ltd.) adhesive, Bostikure D10 curing agent and Bostick M051 cleaner/thinner. PVC material requires Stabond U-148 (Trademark of Stabond Corporation) adhesive and methyl ethyl ketone as a cleaner supplied with these products. The procedures in the manufacturer's manual supplied with these products should be followed for achieving best attachment results.

Figure 9:
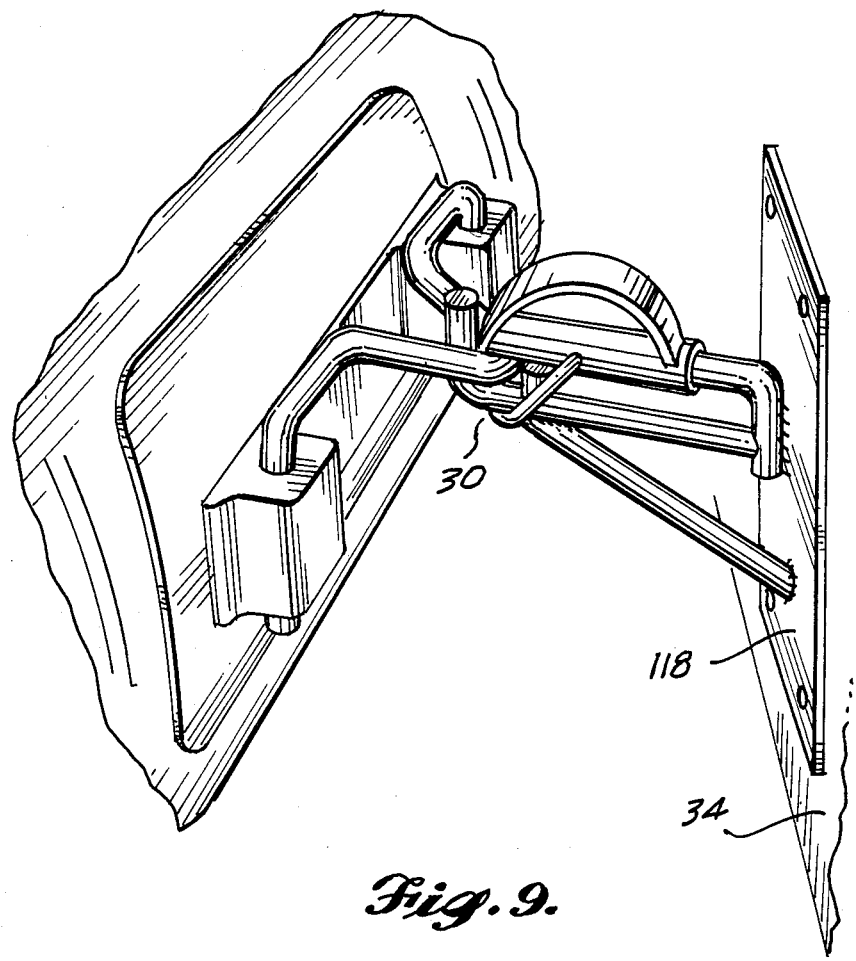
FIG. 9 is an enlarged perspective view showing the engagement between the hanger assembly and the lock device with the lock device attached to a transom mount which, in turn, is attached to the stern of the carrier boat.

An alternate form of mounting the lock device 30 and 32 to the swimstep 54 is attachment directly to the stern 34 of the carrier boat 8 with the aid of a transom mount 118. As shown in FIG. 9, the transom mount 118, which is secured to the lock device, here 30, attaches to the transom 34 in the same manner as to the swimstep 54.

While particular embodiments of the present invention have described in some detail herein above, changes and modifications may be made in the illustrated embodiments without departing from the spirit of the invention.

I claim;

1. A davit system for an inflatable dinghy or other small inflatable boat comprising:

a pair of spaced hanger assemblies adapted to be secured to a tubular sidewall of said inflatable dinghy or other small inflatable boat, each of said hanger assemblies including a resilient flexible pad secured to said dinghy sidewall, and having spaced connector portions projecting outwardly from said dinghy sidewall, said pad aligned so that said connector portions are located along the lengthwise dimension of the dinghy sidewall, and a substantially rigid catch member connected to said connector portions so as to be supported by said pad and extending outwardly from the dinghy sidewall;

a pair of lock devices adapted to be fixed relative to and extending rearwardly from the stern of a carrier boat above the waterline thereof for alignment with said hanger assemblies, each of said lock devices including a means for receiving and locking said substantially rigid catch member of an aligned hanger assembly so as to capture the dinghy and allow it to be swung upwardly and downwardly between a lowered, generally horizontal, in-water position and a raised, generally vertical, out-of-water stowed position; and stand-off support bracket means for supporting the dinghy in its raised, generally vertical, out-of-water stowed position.

2. The davit of claim 1 wherein said lock device includes a base portion for connection to either the top of a step extending rearwardly from the stern of said carrier boat or to a transom mount attached to the stern of said carrier boat.

3. A davit for an inflatable dinghy or other small inflatable boat comprising:

a pair of spaced hanger assemblies adapted to be secured to the tubular sidewall of an inflatable dinghy or other small inflatable boat, each of said hanger assemblies including a catch bar having a centrally located u-shaped bend tipped with a pair of teats, the ends of said catch bar being perpendicular to said catch bar, and a resilient, flexible pad consisting of a thin rectangle with an upstanding lug located near each elongated end of said pad, connecting said lugs is a thickened section of said resilient, flexible pad, said resilient, flexible pad containing an elastomerized cloth strip within each lug and said connecting thickened pad section, said elastomerized cloth strip extending continuously below the surface of the exterior side of each lug, top of each lug, interior side of each lug and the top of said connecting thickened pad section, said elastomerized cloth strip, however, being exterior on all sides to the two openings bisecting the sides of said two lugs, said openings secured the ends of said catch bar, said openings contained hollow tubing, and attached to the bottom of said tubing are plates bent at a midpoint and having a portion extending from said lug into said thickened pad section, said plates extending toward the center of said thickened pad section but being spaced apart thereat to accommodate twisting flexure of said pad; and a pair of lock devices adapted to be fixed relative to and extending rearwardly from the stern of a carrier boat above the waterline thereof for alignment with said hanger assembly, each of said lock devices including an outer hook portion, inner bar portion, and clasp, said outer hook portion and inner bar portion being formed by two L-shaped rods, a bottom one of said two L-shaped rods being connected to a base portion such that the shorter, perpendicular portion of the bottom rod extends past one end of said base portion with said shorter, perpendicular portion of said bottom rod facing away from said base portion, a top one of said two L-shaped rods being attached to said bottom L-shaped rod such that the shorter, perpendicular portion of said top L-shaped rod attaches to the end of said bottom L-shaped rod not possessing a shorter, perpendicular portion, and also attached to said bottom L-shaped rod is said inner bar portion mounted on, but perpendicular to, the major portion of said bottom rod, and said clasp comprises of a tubular sheath placed over the upper of said two rods, a spring means continuously urging said clasp to press against said outer hook portion, a u-shaped guide attached to both sides of said sheath and passing underneath the lower of said two L-shaped rods, and a strip attached to the top portion of said sheath at both ends of said sheath so as to form an arch; and a pair of spaced stand-off support brackets secured to the stern of the carrier boat, above said lock devices, by swedged ends placed through u-shaped brackets, said stand-off brackets extended rearwardly beyond the stern of the carrier boat, each stand-off bracket including a rod tipped with an open-ended u-shaped clasp, each side of said clasp containing a hole through which one stud, forming the clasp closure, moves freely while being connected to a spring-loaded thumb lever attached parallel to said rod, said clasp having the ability to be secured to the inflatable dinghy through plates affixed to the inflatable dinghy by stand-off pads, each stand-off pad containing a plate through which is placed a hole, said hole engaging said stud of said clasp of said stand-off bracket when the inflatable dinghy is in the raised, generally vertical, out-of-water position.

4. A davit system for an inflatable dinghy or other small inflatable boat comprising:

a pair of spaced hanger assemblies adapted to be secured to a tubular sidewall of said inflatable dinghy or other small inflatable boat, each of said hanger assemblies including a resilient flexible pad that is to be secured to said dinghy sidewall, and having a pair of spaced connector portions integral with said resilient, flexible pad, and said pad having a thickened section that extends between said spaced connector portions, said pad aligned so that said connector portions are located along the lengthwise dimension of the dinghy sidewall, and a substantially rigid catch member supported by said pad and extending outwardly from said dinghy sidewall, said substantially rigid catch member including a catch bar having a centrally located u-shaped bend and bent substantially right angle ends, said bent ends being secured in openings provided in said pair of spaced connector portions;

a pair of lock devices adapted to be fixed relative to and extending rearwardly from the stern of a carrier boat above the waterline thereof for alignment with said hanger assemblies, each of said lock devices including means receiving and locking said substantially rigid catch member of an aligned hanger assembly so as to capture the dinghy and allow it to be swung upwardly and downwardly between a lowered, generally horizontal, in-water position and a raised, generally vertical, out-of-water stowed position generally parallel to the plane of the stern; and stand-off support bracket means for supporting the dinghy in its raised, generally vertical, out-of-water stowed position.

5. The davit system of claim 4 wherein said resilient, flexible pad has reinforcing material within each of said spaced connector portions and within said thickened section.

6. The davit system of claim 4 wherein said resilient, flexible pad has hollow tubing within said opening securing said bent end of said catch bar, and said pad also having reinforcement plates.

7. The davit system of claim 6 wherein each of said reinforcement plates are connected to said tubing of said spaced connector portion, is bent at a midpoint, and extends from said spaced connector portion into said thickened pad section such that said reinforcement plates extend toward the center of said thickened pad section but are spaced apart thereat to accommodate twisting flexure of said pad.

8. The davit system of claim 4 wherein upon said u-shaped bend located in the center of said catch bar of said hanger assembly are two teats, said substantially rigid catch member and said lock device joining in the space located between said teats to prevent relative lateral movement between the carrier boat and the dinghy when the dinghy is in the raised, out-of-water position.

9. The davit of claim 4 wherein said stand-off support bracket means include a pair of spaced stand-off brackets secured to the stern of said carrier boat said stand-off brackets extended rearwardly beyond the stern of said carrier boat, each stand-off bracket including a rod tipped with a clasp, each side of said clasp containing an opening through which a stud, forming the clasp closure, moves freely while being connected to a lever attached to said rod, said clasp secured to said inflatable dinghy by plates affixed to said inflatable dinghy by stand-off pads, each of said plates having an opening engaging said stud of said clasp of said stand-off bracket when the inflatable dinghy is in the raised, generally vertical, out-of-water position.

10. A davit system for an inflatable dinghy or small inflatable boat comprising:
a pair of spaced hanger assemblies adapted to be secured to a tubular sidewall of said inflatable dinghy or other small inflatable boat, each of said hanger assemblies including a resilient flexible pad that it is to be secured to said dinghy sidewall, and having spaced connector portions projecting outwardly from said dinghy sidewall, said pad aligned so that said connector portions are located along the lengthwise dimension of the dinghy sidewall, and a substantially rigid catch member connected to said connector portions so as to be supported by said pad and extending outwardly from said dinghy sidewall, said substantially rigid catch member including a catch bar having a centrally located u-shaped bend and bent right angle ends, said bent ends being secured in openings provided in a pair of spaced pad connector means integral with said resilient, flexible pad, and said pad having a thickened section that extends between said spaced pad connector means;
a pair of lock devices adapted to be fixed relative to and extending rearwardly from the stern of a carrier boat above the waterline thereof for alignment with said hanger assemblies, each of said lock devices including means receiving and locking the substantially rigid catch member of an aligned hanger assembly so as to capture the dinghy and allow it to be swung upwardly and downwardly between a lowered, a generally horizontal, in-water position and a raised, generally vertical, out-of-water stowed position, said lock device including two substantially parallel rods, a first of said rods forming an outer hook portion and an inner bar portion between which said substantially rigid catch member attaches, and a second of said rods being attached to said first rod such that said substantially rigid catch member may pass through a space formed by said first rod and said second rod; and
stand-off support bracket means for supporting the dinghy it its raised, generally vertical, out-of-water stowed position.

11. The davit of claim 10 wherein said lock device further includes a hand releasable lock clasp means for locking said substantially rigid catch member between said outer hook portion and said inner bar portion.

12. The davit of claim 11 wherein said lock clasp means each comprises:
a tubular sheath placed over said second rod;
a spring means continuously urging said lock clasp means to press against said outer hook portion of the said first rod;
a substantially u-shaped guide attached to said sheath, passing underneath said first rod such that said guide prevents torquing of said lock clasp; and
an arched strip attached to the top of said sheath, such that said strip guides said substantially rigid catch member toward said outer hook portion of said lock device.

13. A davit hanger assembly for an inflatable dinghy or other small inflatable boat comprising:
a resilient, flexible pad adapted to be secured to a sidewall of a dinghy, said pad having a pair of spaced connector portions, said pad aligned so that said connector portions are located along the lengthwise dimension of said dinghy sidewall, and a substantially rigid catch member connectd to said spaced connector portions, wherein said spaced connector portions transfer the weight of said dinghy from said substantially rigid catch member to said pad and hence to a dinghy sidewall as said dinghy is swung upwardly and downwardly between a lowered, generally horizontal, in-water position and a raised, generally vertical, out-of-water stowed position, said davit hanger assembly adapted to be connected to a boat carrier lock device.

14. The davit hanger assembly of claim 13 wherein said substantially rigid catch member of said hanger assembly includes a catch bar having a centrally located u-shaped bend and bent substantially right angle ends, said bent ends of said catch bar being secured in openings in said spaced connector portions, and said pad having a thickened section that extends between said spaced connector portions.

15. The davit hanger assembly of claim 14 wherein said resilient, flexible pad has reinforcing material within each of said spaced connector portions and said thickened section.

16. The davit hanger assembly of claim 14 wherein said spaced connector portions have hollow tubing within said openings securing said bent ends, and said pad has reinforcement plates.

17. The davit hanger assembly of claim 16 wherein each of said reinforcement plates is connected to said tubing of said spaced connector portion, is bent at a midpoint, and extends from said spaced connector portion into said thickened section such that said reinforcement plates extend toward the center of said thickened section but are spaced apart thereat to accommodate twisting flexure of said pad.

18. The davit hanger assembly of claim 14 wherein upon said u-shaped bend located in the center of said catch bar of said hanger assembly are two teats, said substantially rigid catch member and said lock device joining in the space located between said teats to prevent relative lateral movement between the carrier boat and the dinghy when the dinghy is in the raised, out-of-water position.

* * * * *